June 17, 1930.  E. A. ROBERTSON  1,765,097
PUMP PLUNGER
Filed Aug. 29, 1927
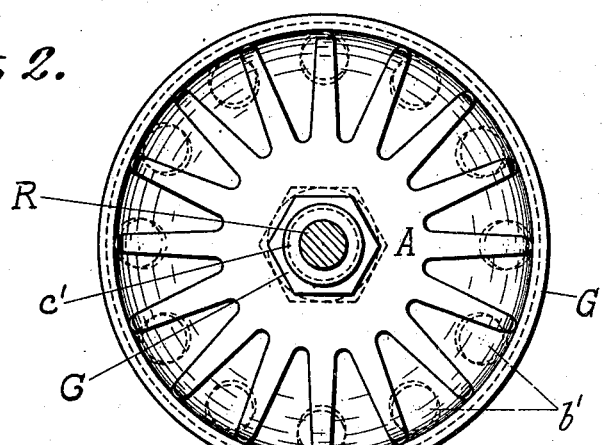
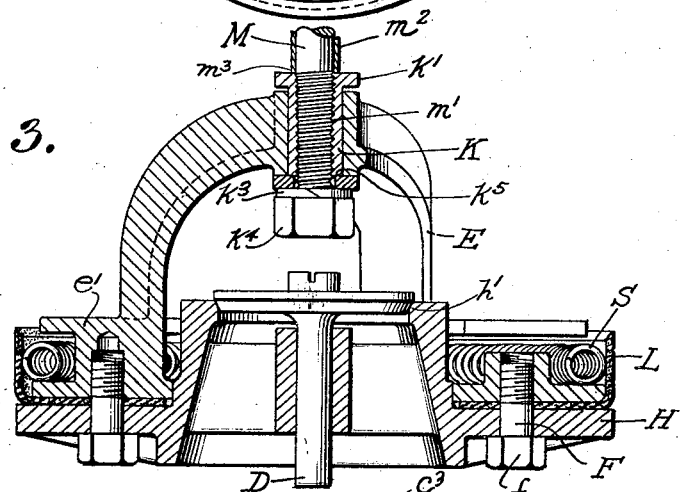
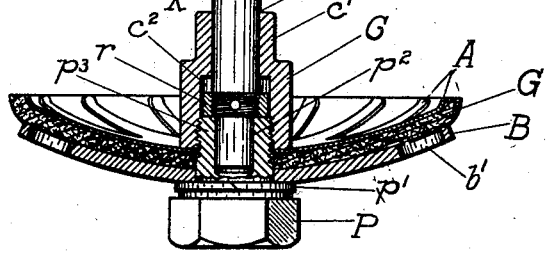
INVENTOR
Edwin A. Robertson
BY
Walter A. Knight.
ATTORNEY Patented June 17, 1930

1,765,097

UNITED STATES PATENT OFFICE

EDWIN A. ROBERTSON, OF LAKE WAWASEE, INDIANA, ASSIGNOR TO WAYNE COMPANY, OF FORT WAYNE, INDIANA, A CORPORATION OF INDIANA

PUMP PLUNGER

Application filed August 29, 1927. Serial No. 216,151.

My invention relates to self measuring pumps and particularly to the plungers for them.

Heretofore, it has been possible in using this type of pump to pump small quantities of liquid without causing the meter to register by a slight jigging forward and backward of the pump handle, moving the plunger a short distance thru a partial stroke. Such operation is commonly known as "milking the pump."

The principal object of my invention is to provide a measuring pump with which the operator is unable to defraud either his employer or the customer. This object is accomplished by allowing a little lost motion between the piston rod and plunger preventing the pumping of any liquid without registering on the meter.

In the particular embodiment of my invention selected for illustration:

Figure 1 is a vertical axial section of the plunger, the rod, retaining nut and its washer being shown in elevation;

Fig. 2, is a top plan view of Fig. 1 as though shown there in full; and

Fig. 3, is a sectional view generally similar to Fig. 1 of a valved plunger.

Referring now to the drawings and particularly Figs. 1 and 2, the pump plunger has a cup-shaped resilient top member A and rigid bottom member B between which is compressed the cup-leather G. A plurality of apertures $b^1$ are provided in the bottom member B. An internally threaded crib C having collar $c^1$, cylindrical chamer $c^2$ and axial aperture $c^3$ seats upon the top member A. A plunger screw P provided with washer $p^1$ passes centrally thru the bottom member B, cup-leather G and top member A, and its threads co-act with the threads on the crib C rigidly securing together the top and bottom members. The plunger rod R passes thru the aperture $c^3$ and its smaller end reciprocates within the axially bored guide $p^2$ of the plunger screw P. A stop $r$ threaded onto the smaller end of the rod R near its lower end makes sliding contact with the cylindrical wall of the chamber $c^2$ limiting the reciprocation of the rod between the end of the stem $p^3$ and top of the chamber $c^2$.

It can readily be understood that by a slight jigging forward and backward of the pump handle, the rod R will slightly reciprocate but will not move the plunger and consequently if the lost motion is coordinated with the meter no liquid will be pumped except by a stroke of the plunger sufficient to cause a meter registration.

Referring now to Fig. 3, the pump plunger has an axially bored cage E with a peripherally recessed flanged bottom $e^1$ comprising the top member of the body of the plunger. A coiled spring S is seated in the recess in the flanged bottom $e^1$. The bottom member H has a conical poppet valve seat $h^1$ therein and a cup-leather L pressed outwardly against the cylinder (not shown) by the spring S and is firmly held between it and the flanged bottom $e^1$ by nuts $f$ on studs F. A poppet valve D seats upon the valve seat $h^1$.

The plunger rod M threaded at its lower end $m^1$ is surrounded by the usual brass sleeve $m^2$ extending to the top of the threaded portion $m^1$ and its lower end forms a shoulder $m^3$ which may be formed for wrench contact. A bushing K having a flange $k^1$ is threaded onto the rod M, the flange $k^1$ seating against the shoulder $m^3$. The bushing K passes thru the axial bore of the cage E. The threaded end $m^1$ of the rod M extends below the end of the bushing K. A washer $k^2$ and lock washer $k^3$ are held firmly onto the rod M by nut $k^4$ against the end $k^5$ of the bushing K. The bushing K and its rod M reciprocate within the axial bore of the cage E, upward movement being limited by contact of the washer $k^2$ with the cage and downward movement by contact of the bottom of the flange $k^1$ with the cage.

I do not wish to be limited to the precise form shown but claim as within the scope of my invention all devices readable on the claims.

I claim as my invention and desire to secure by Letters Patent of the United States:—

1. In combination with a plunger, a valve in said plunger to control the flow of fluid therethrough and a rigid plunger rod independent of said valve; separate means ensuring lost motion between said plunger and plunger rod.

2. In combination with a plunger, valved means in said plunger controlling the flow of fluid therethrough and a rigid plunger rod independent of said valve; separate means on said plunger and plunger rod for allowing relatively slight reciprocation of said plunger rod in relation to said plunger.

3. In combination with a plunger and a rigid plunger rod, valved means in said plunger and independent of said plunger rod controlling the flow of fluid through said plunger; said plunger and plunger rod formed to permit axial movement between them and means on said plunger rod for limiting said movement to ensure a predetermined amount of lost motion of the piston.

In testimony whereof I have hereunto set my hand.

EDWIN A. ROBERTSON.